United States Patent
Guérin et al.

(10) Patent No.: US 10,692,196 B2
(45) Date of Patent: Jun. 23, 2020

(54) COLOR CORRECTION INTEGRATIONS FOR GLOBAL TONE MAPPING

(71) Applicant: GoPro, Inc., San Mateo, CA (US)

(72) Inventors: Guillaume Matthieu Guérin, Paris (FR); Giuseppe Moschetti, Hauts-de-Seine (FR)

(73) Assignee: GoPro, Inc., San Mateo, CA (US)

( * ) Notice: Subject to any disclaimer, the term of this patent is extended or adjusted under 35 U.S.C. 154(b) by 252 days.

(21) Appl. No.: 15/955,855

(22) Filed: Apr. 18, 2018

(65) Prior Publication Data
US 2019/0114750 A1 Apr. 18, 2019

Related U.S. Application Data

(60) Provisional application No. 62/573,809, filed on Oct. 18, 2017.

(51) Int. Cl.
| | |
|---|---|
| *G06T 5/00* | (2006.01) |
| *H04N 9/64* | (2006.01) |
| *H04N 9/67* | (2006.01) |
| *H04N 9/68* | (2006.01) |

(52) U.S. Cl.
CPC ............. *G06T 5/009* (2013.01); *H04N 9/646* (2013.01); *H04N 9/67* (2013.01); *H04N 9/68* (2013.01); *G06T 2207/10024* (2013.01); *G06T 2207/20208* (2013.01)

(58) Field of Classification Search
CPC ... G06T 5/007–009; G06T 2207/10024; G06T 2207/20208; H04N 9/646; H04N 9/67; H04N 9/68
See application file for complete search history.

(56) References Cited

U.S. PATENT DOCUMENTS

| | | | | |
|---|---|---|---|---|
| 2005/0185099 | A1* | 8/2005 | Ohsawa | H04N 1/6027 348/675 |
| 2007/0097462 | A1* | 5/2007 | Goma | H04N 1/4015 358/504 |
| 2009/0052774 | A1* | 2/2009 | Yoshii | G06T 5/009 382/167 |
| 2012/0039531 | A1* | 2/2012 | Hsieh | G06T 5/50 382/167 |
| 2012/0056911 | A1* | 3/2012 | Safaee-Rad | G09G 3/2003 345/690 |
| 2012/0257828 | A1* | 10/2012 | Mishima | H04N 9/643 382/167 |

(Continued)

*Primary Examiner* — Sean T Motsinger
(74) *Attorney, Agent, or Firm* — Young Basile Hanlon & MacFarlane, P.C.

(57) ABSTRACT

Color correction is integrated within global tone mapping operations to modify an image captured using an image capture device. New luminance values are determined for the pixels of the image by performing global tone mapping against those pixels using one or more sets of color correction values, which are applied against respective luminance values and color components of those pixels. The sets of color correction values are identified within 3×3 color correction matrices. A gain curve for modifying contrast values of the image is determined based on at least one of the new luminance values. A modified image is then generated by modifying the contrast values according to the gain curve, for example, by applying a gamma curve against the contrast values using data stored in a three-dimensional lookup table.

20 Claims, 7 Drawing Sheets

(56) References Cited

U.S. PATENT DOCUMENTS

| | | | |
|---|---|---|---|
| 2013/0141611 A1* | 6/2013 | Hirai | H04N 9/67 348/231.3 |
| 2015/0242701 A1* | 8/2015 | Tokui | H04N 5/243 382/190 |
| 2016/0078638 A1* | 3/2016 | Endo | H04N 1/60 382/167 |
| 2016/0364848 A1* | 12/2016 | Douady-Pleven | G06T 3/4015 |
| 2017/0301069 A1* | 10/2017 | Sato | G02B 23/24 |
| 2018/0097992 A1* | 4/2018 | Douady-Pleven | H04N 9/045 |
| 2019/0068865 A1* | 2/2019 | Guerin | H04N 5/23229 |
| 2019/0114750 A1* | 4/2019 | Guerin | G06T 5/009 |
| 2019/0163964 A1* | 5/2019 | Kawamae | G06K 9/00228 |
| 2020/0007839 A1* | 1/2020 | Bist | G06T 5/009 |

* cited by examiner

COLOR CORRECTION INTEGRATIONS FOR GLOBAL TONE MAPPING

CROSS REFERENCE TO RELATED APPLICATION(S)

This disclosure claims the benefit of U.S. Provisional Application No. 62/573,809, filed Oct. 18, 2017, the disclosure of which is hereby incorporated by reference in its entirety.

TECHNICAL FIELD

This disclosure relates to color correction integrations for global tone mapping.

BACKGROUND

Image capture devices, such as cameras, may capture content such as images or video. Light may be received and focused via a lens and may be converted into an electronic image signal by an image sensor. The image signal may be processed by an image signal processor (ISP) to form an image, which may be stored and/or encoded. Combinations of red, green, and blue color components are used to create colors for pixels of the image. The amounts of each of those color components used to create the colors for the pixels represent the intensity levels of the respective colors for those pixels.

SUMMARY

This disclosure describes, inter alia, systems and techniques for color correction integrations for global tone mapping.

One aspect of this disclosure is a method for modifying an image captured using an image capture device. The method includes receiving the image from the image capture device. The image includes multiples pixels, where a given pixel is characterized by color components and a luminance value associated with the color components. The method further includes determining new luminance values for the pixels by performing global tone mapping against the pixels using color correction values applied against respective luminance values and color components of the pixels. The method further includes determining a gain curve for modifying contrast values of the image based on at least one of the new luminance values. The method further includes modifying the image by modifying the contrast values according to the gain curve.

Another aspect of this disclosure is an apparatus for modifying an image. The apparatus comprises an image capture device, a memory, and a processor. The image capture device is configured to capture the image. The image includes pixels, where a given pixel is characterized by color components and a luminance value associated with the color components. The processor is configured to execute instructions stored in the memory to receive the image from the image capture device. For the given pixel, the processor executes instructions stored in the memory to identify a color correction matrix including color correction values for modifying luminance coefficients of the given pixel, determine new luminance coefficients for the given pixel by modifying the luminance coefficients of the given pixel according to individual ones of the color correction values, and determine a new luminance value for the given pixel by modifying magnitudes of the color components of the given pixel according to the new luminance coefficients. The processor executes instructions stored in the memory to determine a gain curve for modifying contrast values of the image based on new luminance values determined for at least some of the pixels. The processor executes instructions stored in the memory to modify the image by modifying the contrast values according to the gain curve.

Another aspect of this disclosure is an image processor. The image processor includes an image modification processing unit. The image modification processing unit is configured to receiving an image. The image includes multiple pixels, where a given pixel is characterized by color components and luminance coefficients. The image modification processing unit is further configured to identify a color correction matrix including color correction values for modifying the luminance coefficients of the given pixel. The image modification processing unit is further configured to determine new luminance coefficients for the given pixel by modifying the luminance coefficients of the given pixel according to individual ones of the color correction values. The image modification processing unit is further configured to modify the image using a new luminance value for the given pixel. The new luminance value is determined by modifying magnitudes of the color components of the given pixel according to the new luminance coefficients.

These and other aspects of the present disclosure are disclosed in the following detailed description, the appended claims, and the accompanying figures.

BRIEF DESCRIPTION OF THE DRAWINGS

The disclosed implementations have other advantages and features that will be more readily apparent from the detailed description, the appended claims, and the accompanying figures. A brief introduction of the figures is below.

DETAILED DESCRIPTION

Figure 1:
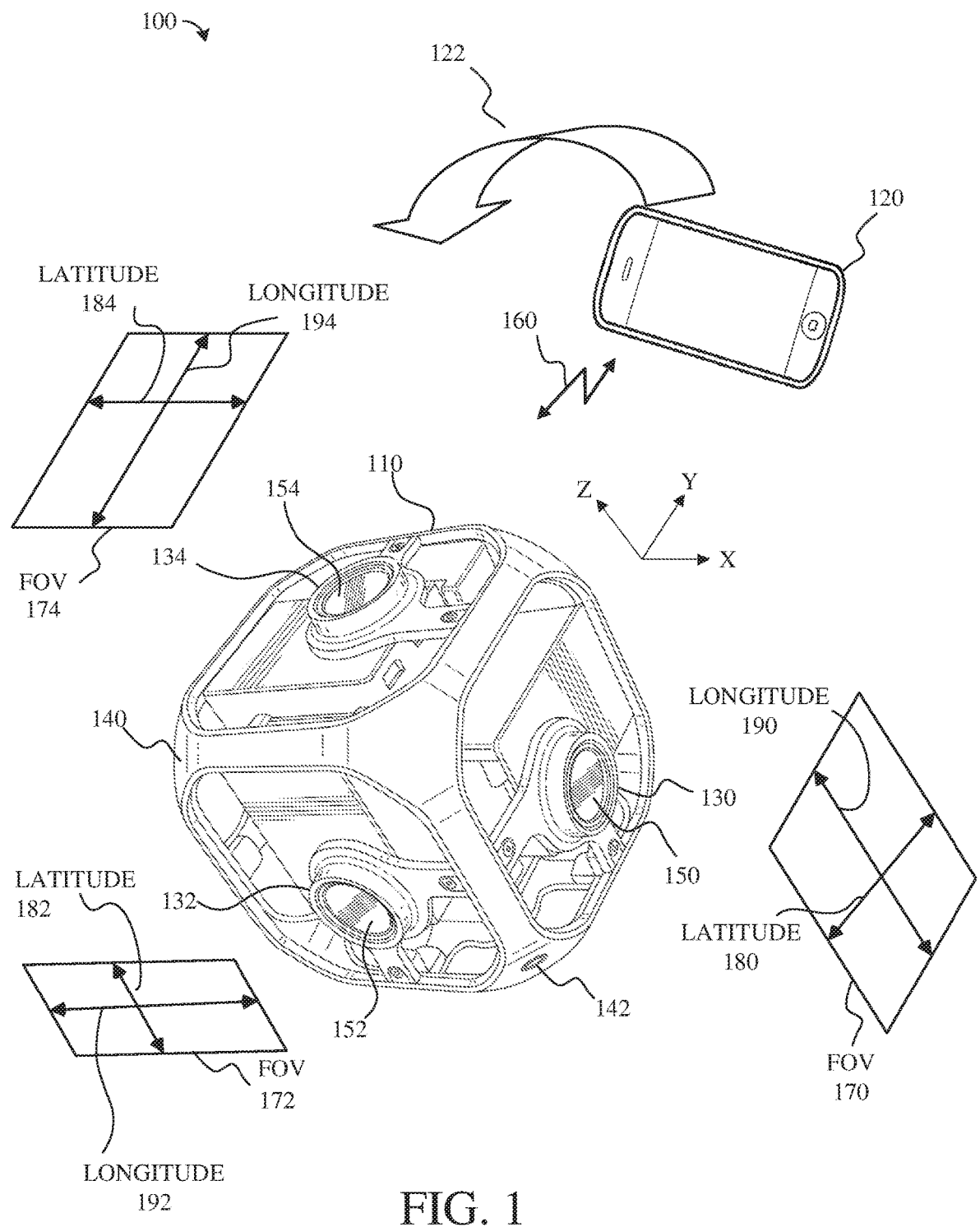
FIG. 1 shows an example of an image capture system for content capture.

An image capture device captures an image by using image sensors to measure the intensity of light exposed to those image sensors. The measured light intensities are converted into a voltage measurement as an analog signal. The process for converting those measured light intensities into a voltage measurement results in noise being generated against the image. The amount of noise produced as a result of the conversion process may be reduced using post-processing techniques, such as to improve the quality of the image that is output for display. One example of such a post-processing technique is global tone mapping.

Global tone mapping is applied against a linear signal. The linear signal may, for example, include raw image data that has been black level demosaiced and white balance compensated, or image data that has been inverse gamma processed to re-linearize a previously non-linear signal. The global tone mapping is very sensitive to the luminance of pixels of an image and thus is typically performed after operations for color correction (e.g., color matrix application). Color correction compensates the difference between image sensor sensitivity for luminance and colors of pixels against the sensitivities common to human viewers. That is, the color correction typically prepares the image for the global tone mapping.

However, in some cases, it may not be possible for global tone mapping to be applied after color correction. For example, the hardware and/or software components for some image capture devices may simultaneously perform color correction and transform the linear signal of the image into a non-linear signal. In such a case, the global tone mapping would have to be performed before the color correction, which could result in insufficient luminance and thus ineffective denoising. Alternatively, the signal would have to be re-linearized after the color correction, which would be costly and redundant.

Implementations of this disclosure integrate correction within global tone mapping operations to modify an image captured using an image capture device. New luminance values are determined for the pixels of the image by performing global tone mapping against those pixels using one or more sets of color correction values, which are applied against respective luminance values and color components of those pixels. The sets of color correction values are identified within 3×3 color correction matrices. A gain curve for modifying contrast values of the image is determined based on at least one of the new luminance values. A modified image is then generated by modifying the contrast values according to the gain curve, for example, by applying a gamma curve against the contrast values using data stored in a three-dimensional lookup table.

The implementations of this disclosure will now be described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 shows an example of an image capture system 100 for content capture. As shown in FIG. 1, an image capture system 100 may include an image capture apparatus 110, a user interface device 120 external to the image capture apparatus, or a combination thereof. The image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include other numbers of image capture devices. For example, the image capture apparatus 110 shown in FIG. 1 may include six cameras, which may include the three image capture devices 130, 132, 134 shown and three cameras not shown.

The structure 140 may have dimensions, such as between 25 mm and 150 mm. For example, the length of each side of the structure 140 may be 105 mm. The structure 140 may include a mounting port 142, which may be removably attachable to a supporting structure, such as a tripod, a photo stick, or another camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, each of the image capture devices 130, 132, 134 may include respective lenses, for receiving and focusing light, and respective image sensors for converting the received and focused light into an image signal, such as by measuring or sampling the light, and the multiple image capture devices 130, 132, 134 may be arranged such that respective image sensors and lenses capture a combined field-of-view characterized by a spherical or near-spherical field-of-view.

Each of the image capture devices 130, 132, 134 may have a respective field-of-view 170, 172, 174, such as a field-of-view 170, 172, 174 that includes 90° in a latitudinal dimension 180, 182, 184 and includes 120° in a longitudinal dimension 190, 192, 194. In some cases, the image capture devices 130, 132, 134 having overlapping fields-of-view 170, 172, 174, or the image sensors thereof, may be oriented at defined angles, such as at 90°, with respect to one another. The image sensor of the image capture device 130 is directed along the X axis, the image sensor of the image capture device 132 is directed along the Y axis, and the image sensor of the image capture device 134 is directed along the Z axis.

The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the latitudinal dimension 184 of the field-of-view 174 for the image capture device 134, the latitudinal dimension 180 of the field-of-view 170 for the image capture device 130 may be oriented at 90° with respect to the longitudinal dimension 192 of the field-of-view 172 for the image capture device 132, and the latitudinal dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively, may be combined to provide 420° angular coverage in a horizontal plane.

The overlap between fields-of-view of the image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by each image capture device 130, 132, 134 may be combined to form a panoramic image.

One or more of the image capture devices 130, 132, 134 may include a lens 150, 152, 154 or other optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. The lens 150, 152, 154 may, for example, be a fisheye lens and produce fisheye, or near-fisheye, field-of-view images. For example, the respective lenses 150, 152, 154 of the image capture devices 130, 132, 134 may be fisheye lenses.

Images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed into a first rectangular image; a second fisheye image may be a round or elliptical image, and may be transformed into a second rectangular image; and the first and second rectangular images may be arranged side-by-side, which may include overlapping, and stitched together to form the equirectangular planar image.

Although not expressly shown in FIG. 1, in some implementations, each of the image capture devices 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or another image sensor or combination of image sensors. Although not expressly shown in FIG. 1, in some implementations, the image capture apparatus 110 may include one or more microphones, which may receive, capture, and record audio information, which may be associated with images acquired by the image sensors. Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or another unit, or combination of units, that may be included in an image capture apparatus.

Although the computing communication link 160 shown in FIG. 1 is shown as a direct computing communication link, an indirect computing communication link, such as a link including another device or a network, such as the Internet, may be used. In some implementations, the computing communication link 160 may be a Wi-Fi link, an infrared link, a Bluetooth (BT) link, a cellular link, a ZigBee link, a near-field communications (NFC) link, such as an ISO/IEC 23243 protocol link, an Advanced Network Technology interoperability (ANT+) link, and/or another wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may interface with or communicate with an external device, such as the user interface device 120, via a wired (not shown) or wireless (as shown) computing communication link 160. Although a single computing communication link 160 is shown in FIG. 1 for simplicity, other numbers of computing communication links may be used. In some implementations, the image capture apparatus 110 may communicate with one or more other external devices (not shown) via wired or wireless computing communication links (not shown). In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture apparatus 110 using a communication interface, such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata, and/or other parameters. In some implementations, a multiplexed stream may be generated to incorporate a video and/or audio track and one or more metadata tracks.

In some implementations, the user interface device 120 may implement or execute one or more applications, such as GoPro Studio, GoPro App, or both, to manage or control the image capture apparatus 110. For example, the user interface device 120 may include an application for controlling camera configuration, video acquisition, video display, or another configurable or controllable aspect of the image capture apparatus 110.

In some implementations, the user interface device 120, such as via an application (e.g., GoPro App), may generate and share, such as via a cloud-based or social media service, one or more images or short video clips, such as in response to user input. In some implementations, the user interface device 120, such as via an application (e.g., GoPro App), may remotely control the image capture apparatus 110, such as in response to user input. In some implementations, the user interface device 120, such as via an application (e.g., GoPro App), may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application (e.g., GoPro App), may mark one or more key moments contemporaneously with capturing the images or video by the image capture apparatus 110, such as with a HiLight Tag, such as in response to user input. In some implementations, the user interface device 120, such as via an application (e.g., GoPro App), may display, or otherwise present, marks or tags associated with images or video, such as HiLight Tags, such as in response to user input. For example, marks may be presented in a GoPro Camera Roll application for location review and/or playback of video highlights. In some implementations, the user interface device 120, such as via an application (e.g., GoPro App), may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture apparatus 110.

Figure 2:
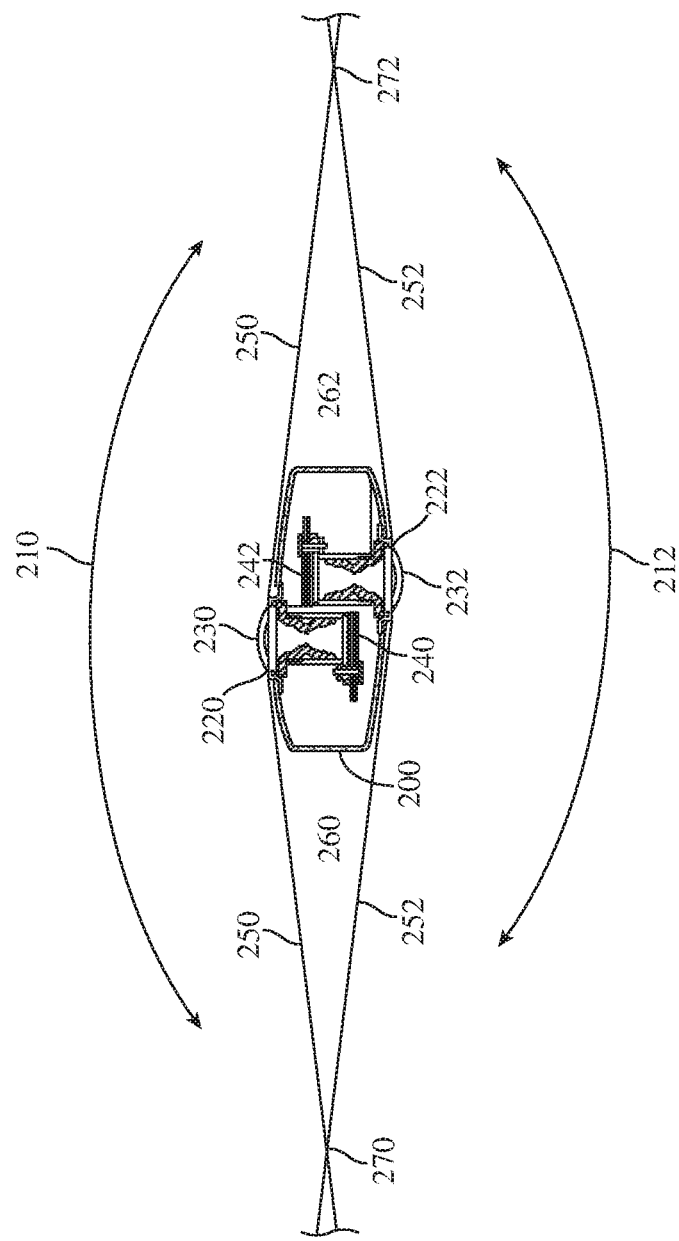
FIG. 2 is a cross-sectional view of an example of an image capture apparatus including overlapping fields-of-view.

FIG. 2 is a cross-sectional view of an example of a dual-lens image capture apparatus 200 including overlapping fields-of-view 210, 212. In some implementations, the image capture apparatus 200 may be a spherical image capture device with fields-of-view 210, 212 as shown in FIG. 2. For example, the image capture apparatus 200 may include image capture devices 220, 222, related components, or a combination thereof, arranged in a back-to-back or Janus configuration. For example, a first image capture device 220 may include a first lens 230 and a first image sensor 240, and a second image capture device 222 may include a second lens 232 and a second image sensor 242 arranged oppositely from the first lens 230 and the first image sensor 240.

The first lens 230 of the image capture apparatus 200 may have the field-of-view 210 shown above a boundary 250. Behind the first lens 230, the first image sensor 240 may capture a first hyper-hemispherical image plane from light entering the first lens 230, corresponding to the first field-of-view 210.

The second lens 232 of the image capture apparatus 200 may have a field-of-view 212 as shown below a boundary 252. Behind the second lens 232, the second image sensor 242 may capture a second hyper-hemispherical image plane from light entering the second lens 232, corresponding to the second field-of-view 212.

One or more areas, such as blind spots 260, 262, may be outside of the fields-of-view 210, 212 of the lenses 230, 232, light may be obscured from the lenses 230, 232 and the corresponding image sensors 240, 242, and content in the blind spots 260, 262 may be omitted from capture. In some implementations, the image capture apparatus 200 may be configured to minimize the blind spots 260, 262.

The fields-of-view 210, 212 may overlap. Stitch points 270, 272, proximal to the image capture apparatus 200, at which the fields-of-view 210, 212 overlap may be referred to herein as overlap points or stitch points. Content captured by the respective lenses 230, 232, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A small change in the alignment, such as position and/or tilt, of the lenses 230, 232, the image sensors 240, 242, or both may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture apparatus 200 may maintain information indicating the location and orientation of the lenses 230, 232 and the image sensors 240, 242 such that the fields-of-view 210, 212, stitch points 270, 272, or both may be accurately determined, which may improve the accuracy, efficiency, or both of generating a combined image.

Optical axes through the lenses 230, 232 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 230, 232, such that the image sensors may be perpendicular to the respective axes to within a tolerance such as 1%, 3%, 5%, 10%, and/or other tolerances.

The lenses 230, 232 may be laterally offset from each other, may be off-center from a central axis of the image capture apparatus 200, or may be laterally offset and off-center from the central axis. As compared to an image capture apparatus with back-to-back lenses, such as lenses aligned along the same axis, the image capture apparatus 200 including laterally offset lenses 230, 232 may include substantially reduced thickness relative to the lengths of the lens barrels securing the lenses 230, 232. For example, the overall thickness of the image capture apparatus 200 may be close to the length of a single lens barrel as opposed to twice the length of a single lens barrel as in a back-to-back configuration. Reducing the lateral distance between the lenses 230, 232 may improve the overlap in the fields-of-view 210, 212.

Images or frames captured by an image capture apparatus, such as the image capture apparatus 110 shown in FIG. 1 or the image capture apparatus 200 shown in FIG. 2, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 3:
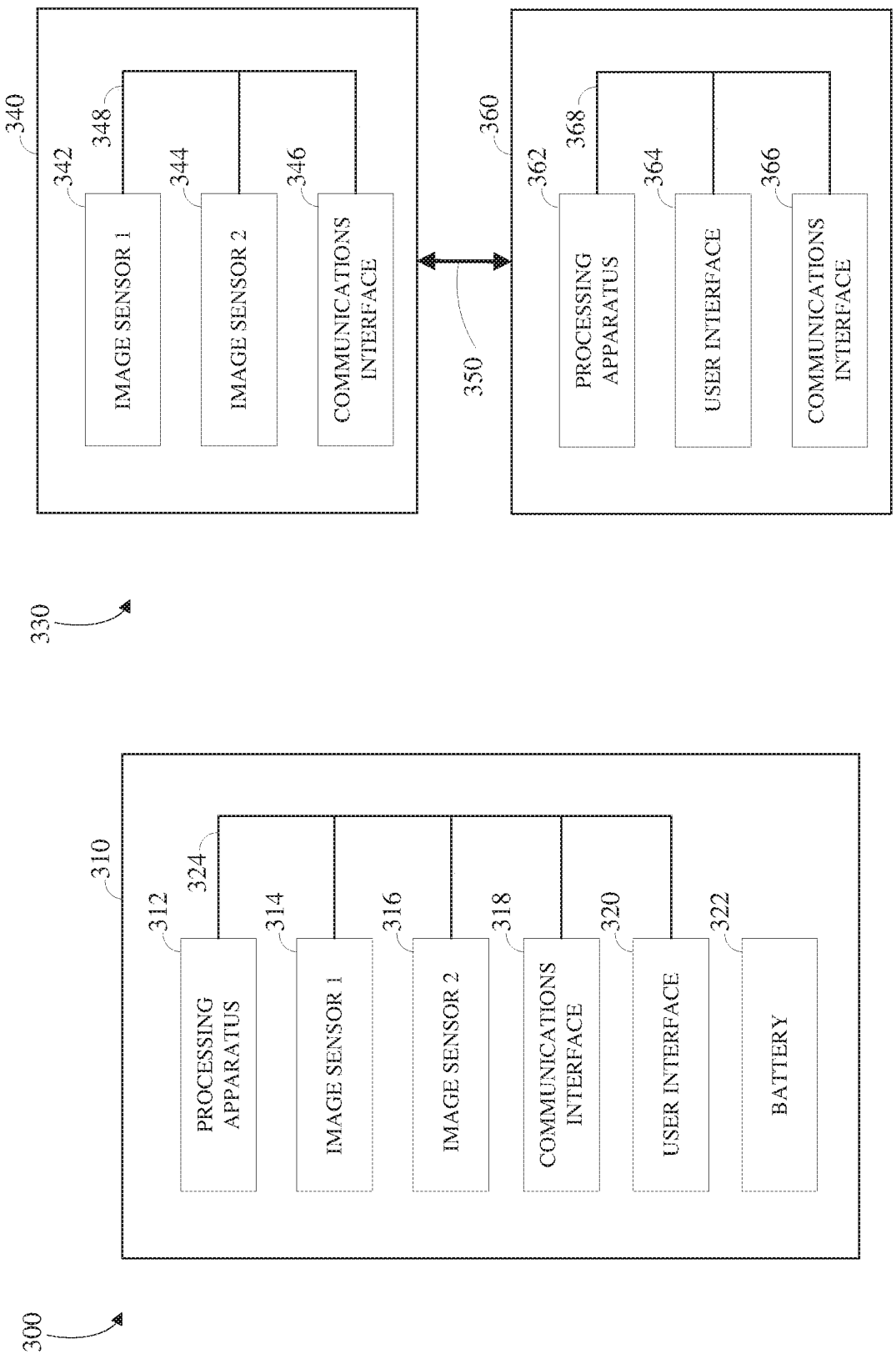
FIG. 3A is a block diagram of a first example of a system configured for image capture and tone mapping.
FIG. 3B is a block diagram of a second example of a system configured for image capture and tone mapping.

FIG. 3A is a block diagram of an example of a system 300 configured for image capture and tone mapping. The system 300 includes an image capture device 310 (e.g., a camera or a drone), which may, for example, be one of the image capture devices 130 shown in FIG. 1. The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensors 314 and 316.

The image capture device 310 includes a communications interface 318 for transferring images to other devices. The image capture device 310 includes a user interface 320, which may allow a user to control image capture functions and/or view images. The image capture device 310 includes a battery 322 for powering the image capture device 310. The components of the image capture device 310 may communicate with each other via the bus 324. The system 300 may be used to implement some or all of the techniques described in this disclosure, such as the technique 400 of FIG. 4, the technique 500 of FIG. 5, or a combination thereof.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 are configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The image capture device 310 may include a communications interface 318, which may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The image capture device 310 may include a user interface 320. For example, the user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures. The image capture device 310 may include a battery 322 that powers the image capture device 310 and/or its peripherals. For example, the battery 322 may be charged wirelessly or through a micro-USB interface.

In some implementations, the image capture device 310 may include one or more hardware or software components for performing global tone mapping against pixels of an image captured using the image capture device 310. The global tone mapping performed using those one or more hardware or software components may integrate color correction operations. For example, those one or more hardware or software components may be used to perform one or both of the technique 400 or the technique 500, respectively, described below with respect to FIGS. 4 and 5.

FIG. 3B is a block diagram of an example of a system 330 configured for image capture and tone mapping. The system 330 includes an image capture device 340 and a personal computing device 360 that communicate via a communications link 350. The image capture device 340 may, for example, be one of the image capture devices 130 shown in FIG. 1. The personal computing device 360 may, for example, be the user interface device 120 shown in FIG. 1. The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor, and receive a second image from the second image sensor 344. The processing apparatus 362 may be configured to perform image signal processing (e.g., filtering, tone mapping, stitching, and/or encoding) to generate output images based on image data from the image sensors 342 and 344. The system 330 may be used to implement some or all of the techniques described in this disclosure, such as the technique 400 of FIG. 4, the technique 500 of FIG. 5, or a combination thereof.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via the bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via the bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or snap photograph) received via the user interface 364 may be passed on to the image capture device 340 via the communications link 350.

In some implementations, the image capture device 340 and/or the personal computing device 360 may include one or more hardware or software components for performing global tone mapping against pixels of an image captured using the image capture device 340. The global tone mapping performed using those one or more hardware or software components may integrate color correction operations. For example, those one or more hardware or software components may be used to perform one or both of the technique 400 or the technique 500, respectively, described below with respect to FIGS. 4 and 5.

Figure 4:
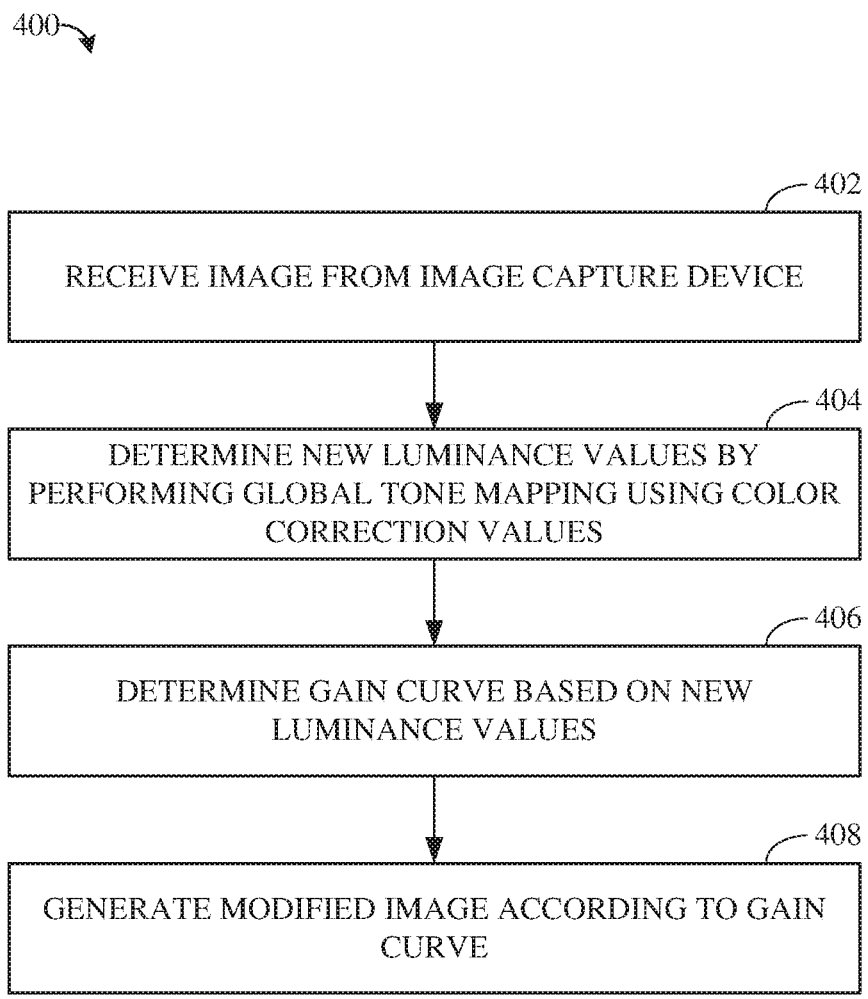
FIG. 4 is a flowchart showing an example of a technique for modifying an image by integrating color correction within global tone mapping operations.

FIG. 4 is a flowchart showing an example of a technique 400 for modifying an image by integrating color correction within global tone mapping operations. The technique 400 can be performed, for example, using hardware and/or software components of an image capture system, such as the image capture system 100 shown in FIG. 1 or the image capture apparatus 200 shown in FIG. 2. For example, the image capture system 100 or the image capture apparatus 200 may include one or more software components that process an image captured using an image capture device of the image capture system 100 or the image capture apparatus 200, for example, to perform global tone mapping against pixels of the image.

In another example, the technique 400 (and, thus, the technique 500 described below with respect to FIG. 5) can be performed using an integrated circuit. The integrated circuit may, for example, be a field programmable gate array (e.g., FPGA), programmable logic device (PLD), reconfigurable computer fabric (RCF), system on a chip (SoC), ASICs, and/or another type of integrated circuit. An image processor of the integrated circuit includes an image modification processing unit (e.g., a processor having one or multiple cores) configured to execute instructions to perform some or all of the technique 400.

Although the technique 400 is described with respect to a series of operations, the operations comprising the technique 400 may be performed in orders other than those described herein. In some implementations, the technique 400 may include additional, fewer, or different operations than those described herein.

At 402, an image is received from an image capture device. The image includes pixels. Each pixel of the image has, and is characterized by, color components, for example: R, G, B color components; R, Gr, Gb, B color components; or the like. Each pixel of the image also has a luminance value associated with each of the color components. The luminance value for a given pixel represents a brightness intensity of that pixel and may be determined based on a weighted average of the color components of that pixel.

For example, the luminance value for a given pixel may be defined as $Y(R,G,B)=\alpha*R+\beta*G+\gamma*B$, where $\alpha$, $\beta$, and $\gamma$ represent luminance coefficients applied against intensity values of the color components R, G, and B, respectively, to determine the luminance Y. In one example, the values of $\alpha$, $\beta$, and $\gamma$ may, respectively, be 0.3, 0.55, and 0.15. In another example, the values of $\alpha$, $\beta$, and $\gamma$ may respectively be 0.299, 0.7152, and 0.0722. Other examples of values of $\alpha$, $\beta$, and $\gamma$ are possible.

At 404, new luminance values are determined for pixels of the image. The new luminance values will be used in place of the luminance values included in the image as-received. That is, an output version of the image will use the new luminance values. The new luminance values are determined by performing global tone mapping against pixels of the image using one or more sets of color correction values. The color correction values are applied against the luminance values and color components of the pixels of the image during the operations for performing the global tone mapping.

Global tone mapping refers to operations for mapping sets of colors and associated brightness intensities across pixels of the image. The output of the global tone mapping operations is an estimation of how the pixels of the image are to be mapped. The estimation can be implemented by adjusting aspects of the image. For example, global tone mapping can be applied as a variable gain that is applied on the linear RGB values according to their luminance in order to have a better repartition of the information on the output range. This gain may depend on an input histogram of luminance values and a target histogram that has to be matched (e.g., a flat histogram to equalize the image or a Gaussian histogram to have a better enhancement of shadows/highlights).

Consider a pixel value $x=[R,G,B]^T$. A global tone mapping gain function g may be applied as $y=g(Y(x))*x$, where y is a global tone mapped pixel value and $Y(x)$ is a luminance value associated with the color components R, G, B (e.g., such that $Y(x)$ is a discrete approximation of the luminance defined by a linear combination of the R, G, and B channels for the pixel value x). As such, the use of global tone mapping to adjust gain aspects may refer to the adjustment of brightness intensities and corresponding color component values rather than an actual reconfiguration of shutter speed and light exposure for the image capture device.

Implementations and examples of systems and techniques for global tone mapping are further described in U.S. patent application Ser. No. 15/081,682 by inventors Bruno Cesar Douady-Pleven, Michael Serge André Kraak, Guillaume Matthieu Guerin, and Thomas Nicolas Emmanuel Veit, entitled "Global Tone Mapping," filed Mar. 25, 2016 (Douady-Pleven et al.), the disclosure of which is incorporated herein by reference.

As briefly stated above, performing the global tone mapping against pixels of the image using one or more sets of color correction values incorporates operations for color correction within the operations for global tone mapping. As a result, a new luminance value is determined for a given pixel. For example, a color correction matrix including a set of color correction values can be identified and used to adjust the luminance coefficients α, β, and γ for the given pixel, such as to produce new luminance coefficients.

Those new luminance coefficients may then be applied against intensity values of the color components of the pixel to determine the new luminance value for the pixel. In some cases, new luminance values may be determined for each pixel of the image. In other cases, new luminance values may be determined for some, but not all, pixels of the image. In either case, the new luminance values are determined while the image remains in a linear signal. Implementations for determining a new luminance value for a pixel by incorporating color correction within global tone mapping are described below with respect to FIG. 4.

At 406, a gain curve is determined. The gain curve is used to modify contrast values of the image based on the new luminance values determined by performing global tone mapping. The gain curve may, for example, be a best fitting gain curve estimated by the performance of global tone mapping operations. That is, different portions of the image may reflect different brightness intensities based on the luminance values associated therewith. The contrast values of the image thus reflect the differences in brightness intensities about the image. The gain curve may be a smoothing curve used to adjust the contrast values, for example, such that the image appears to have similar brightness intensities throughout the image. For example, the pixel mapping determined by performing the global tone mapping operations may result in changes in contrast to the image. The gain curve may smooth out those changes in contrast, such as to improve the appearance of the image before it is output for display.

At 408, a modified image is generated by modifying the contrast values of the image according to the gain curve. Generating the modified image includes modifying the image by modifying the contrast values of the image according to the gain curve. The gain curve modifies the contrast values of the image to enhance the image, for example, to improve dynamic color range values of the image. For example, generating the modified image can include applying a gamma curve against the contrast values of the image using data stored in a three-dimensional lookup table (3DLUT). The gamma curve or other curve applied may reflect a tone transfer function for converting energy levels at respective locations in the image according to the new luminance values determined earlier. Modifying the contrast values of the image according to the gain curve may in at least some cases include encoding the modified image. Implementations and examples of systems and techniques for determining a gain curve and using the gain curve to modify an image (e.g., including by modifying the contrast values thereof) are further described in the '682 application of Douady-Pleven et al., supra.

Figure 5:
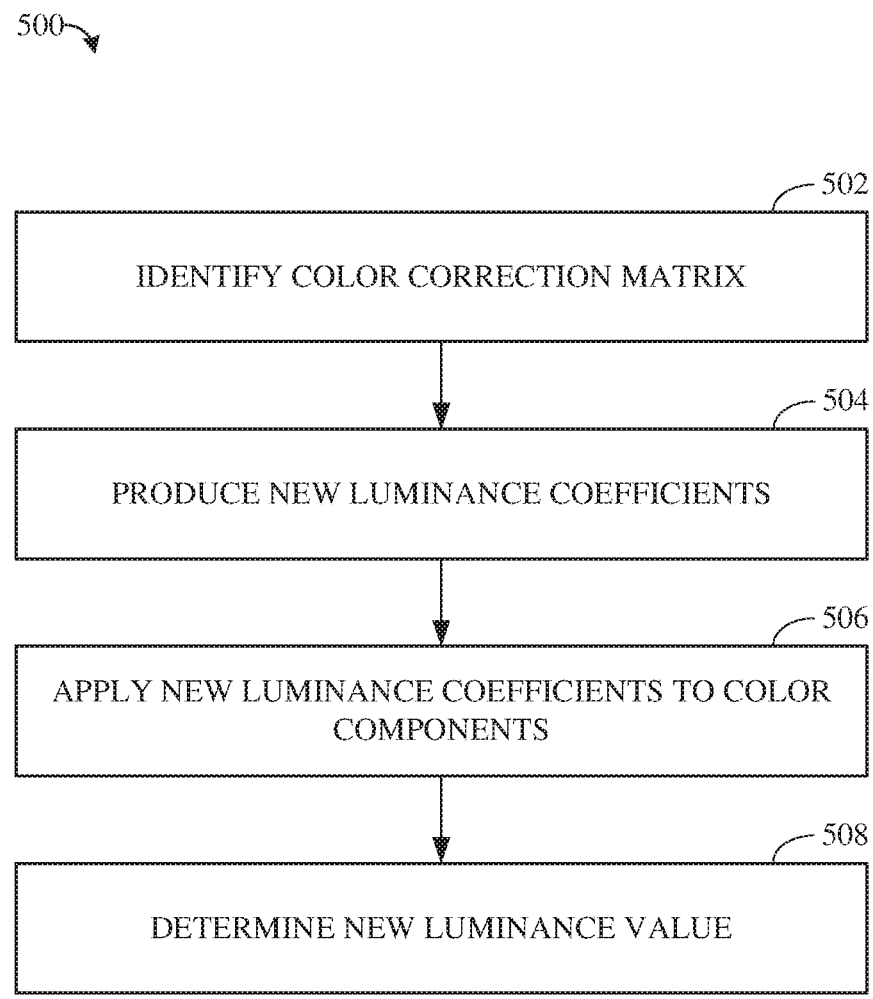
FIG. 5 is a flowchart showing an example of a technique for integrating color correction within a global tone mapping operation.

FIG. 5 is a flowchart showing an example of a technique 500 for integrating color correction within a global tone mapping operation. The technique 500 may, for example, represent operations performed as part of the technique 400. For example, the technique 500 can be performed to determine new luminance values for pixels of an image, such as described above with respect to FIG. 4.

At 502, a color correction matrix is identified. The color correction matrix may, for example, be a 3×3 matrix. The color correction matrix includes a set of color correction values for modifying the luminance coefficients of a given pixel against which the color correction-integrated global tone mapping is performed. For example, the color correction matrix may be defined as $M_x=[C_{11}, C_{12}, C_{13}, C_{21}, C_{22}, C_{23}, C_{31}, C_{32}, C_{33}]$, where a value $C_{ij}$ represents the color correction value at row i, column j of the color correction matrix. The color correction may, for example, be a matrix identified as a result of red/blue scaling, green-red/green-blue scaling, or the like, at a location of the pixel within the image. The color correction values of the color correction matrix reflect scaled red/blue, scaled green-red/green-blue, or like scaled color values. As such, identifying the color correction matrix may, for example, include performing Bayer scaling or other scaling against the image.

At 504, new luminance coefficients are determined. The new luminance coefficients are determined by modifying the luminance coefficients of the pixels (e.g., one of the luminance coefficients α, β, and γ) according to the color correction values from the color correction matrix to. For example: determining a first new luminance coefficient, α', includes modifying each of the luminance coefficients of a given pixel according to the color correction values of the first column of the color correction matrix; determining a second new luminance coefficient, β', includes modifying each of the luminance coefficients of a given pixel according to the color correction values of the second column of the color correction matrix; and determining a third new luminance coefficient, γ', includes modifying each of the luminance coefficients of a given pixel according to the color correction values of the third column of the color correction matrix. The new luminance coefficients may thus be defined as $α'=α*C_{11}+β*C_{21}+γ*C_{31}$, $β'=α*C_{12}+β*C_{22}+γ*C_{32}$, and $γ'=α*C_{13}+β*C_{23}+γ*C_{33}$.

At 506, the new luminance coefficients are applied to color components of the pixel. Applying the luminance coefficients to the color components of the pixel includes modifying magnitudes of the color components of the pixel according to the luminance coefficients. Each of the new luminance coefficients may be applied to an intensity value (e.g., a magnitude) of one of the color components of the pixel. For example, a first color component of the given pixel may be modified according to a first new luminance coefficient, α', to determine a first value; a second color component of the given pixel may be modified according to a second new luminance coefficient, β', to determine a second value; and a third color component of the given pixel may be modified according to a third new luminance coefficient, γ', to determine a third value. For example, the first value can be defined as $first\_value=α'*R$, where R represents the magnitude for the red color component of the pixel; the first value can be defined as $second\_value=β'*G$, where G represents the magnitude for the green color component of the pixel; and the third value can be defined as $third\_value=γ'*B$, where B represents the magnitude for the blue color component of the pixel.

At 508, a new luminance value is determined for the pixel. Determining the new luminance value for the pixel can include combining the first value, the second value, and the third value determined based on the new luminance coefficients α', β', and γ'. For example, the new luminance value Y' for the color components R, G, B can be defined as $Y'(R,G,B)=α'*R+β'*G+γ'*B$. The new luminance value Y' may then be used to determine a gain curve (e.g., a best-fitting gain curve) as part of the global tone mapping of the image, such as described above with respect to FIG. 3. For example, the gain curve may be defined as $g'(Y(M_x))$. The image may then be modified (e.g., as described above with respect to FIG. 3) using the gain curve using $Gamma(g(Y(M_x))*M_x)=3DLUT(g'(Y(M_x))*x)$.

In some implementations, it may not be possible to identify the color correction values before performing the global tone mapping. For example, the color matrix may be processed in a separate part of the image pipeline from the global tone mapping operations. In such an implementation, placeholder variables can be used during the global tone mapping, which placeholder variables may later be replaced with the color correction values. For example, a new luminance value may be defined as $Y'(R,G,B)=(α*C_{11}+β*C_{21}+γ*C_{31})*R+(α*C_{12}+β*C_{22}+γC_{32})*G+(α*C_{13}+β*C_{23}+γ*C_{33})*B$.

Figure 6:
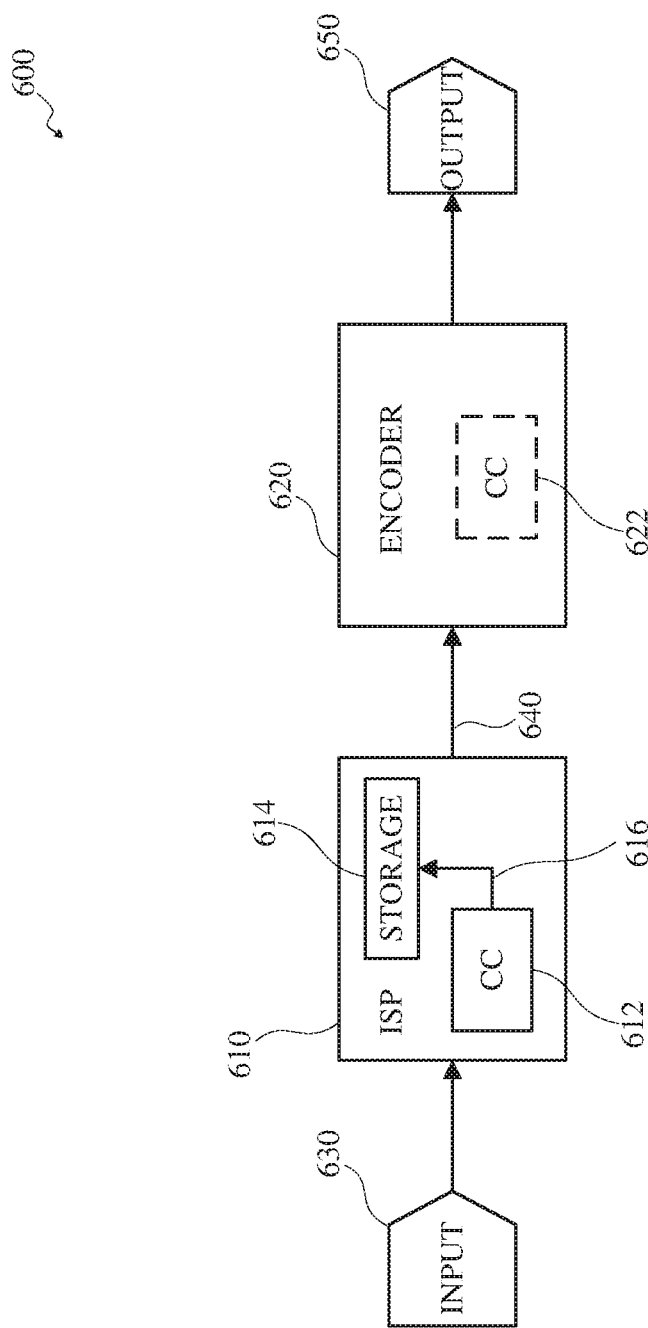
FIG. 6 is a block diagram of an example of an image processing and coding pipeline.

FIG. 6 is a block diagram of an example of an image processing and coding pipeline 600. In some implementations, the image processing and coding pipeline 600 may be included in an image capture device, such as the image capture device 130 shown in FIG. 1, or an image capture apparatus, such as the image capture apparatus 110 shown in FIG. 1 or the image capture apparatus 200 shown in FIG. 2. In some implementations, the image processing and coding pipeline 600 may represent functionality of an integrated circuit, for example, including an image modification processing unit. In some implementations, the image processing and coding pipeline 600 may include an image signal processor 610, an encoder 620, or a combination thereof.

The image signal processor 610 may receive an input image signal 630. For example, an image sensor (not shown), such as the image capture device 130, may capture an image, or a portion thereof, and may send, or transmit, the captured image, or image portion, to the image signal processor 610 as the input image signal 630. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

The image signal processor 610 may include a color correction unit 612 that processes the input image signal 630, such as using global tone mapping with integrated color correction. For example, the color correction unit 612 can perform some or all operations of the technique 400 shown in FIG. 4, the technique 500 shown in FIG. 5, or both. Implementations and examples of functionality of the color correction unit 612 are described below with respect to FIG. 7.

The image signal processor 610 of the image processing and coding pipeline 600 may include an internal electronic storage unit 614, such as shared memory, such as RAM, flash, or other types of memory. The internal electronic storage unit 614 may store color correction information 616 determined by the color correction unit 612 for one or more frames. The color correction information 616 and associated image or images may be output 640 to the encoder 620. In some implementations, the internal electronic storage unit 614 may include a buffer, or cache, and may buffer the input image signal as an input, or source, image, or frame.

The image signal processor 610 may output an image, associated color correction information 616, or both as the output 640. For example, the image signal processor 610 may receive the input image signal 630, process the input image signal 630, and output a processed image as the output 640. Processing the input image signal 630 may include generating and using the color correction information 616, 3DNR, dynamic range enhancement, local tone adjustment, exposure adjustment, contrast adjustment, image stitching, and/or output of other operations.

The encoder 620 may encode or compress the output 640 of the image signal processor 610. The encoder 620 may output an encoded image or encoded video as an encoded output 650. For example, the encoder 620 may receive the output 640 of the image signal processor 610, which may include processed images, the color correction information 616, or both. The encoder 620 may encode the images and may output the encoded images as the encoded output 650.

In some implementations, the encoder 620 may include a color correction unit 622 that may process the color correction information 616 and other color correction information for encoding the output 640 of the image signal processor 610. For example, the color correction unit 612 may generate the color correction information 616 for each pixel of an image to encode. The color correction unit 622 may then combine and process the color correction information 616 for each pixel together, such as to encode the image associated with the color correction information 616.

The image signal processor 610, the encoder 620, or both may be distinct units, as shown. For example, the image signal processor 610 may include a color correction unit, such as the color correction unit 612 as shown, and/or the encoder 620 may include a color correction unit, such as the color correction unit 622.

The image signal processor 610 may store motion information, such as the color correction information 616, in a memory, such as the internal electronic storage unit 614, and the encoder 620 may read the color correction information 616 from the internal electronic storage unit 614 or otherwise receive the color correction information 616 from the image signal processor 610. The encoder 620 may use the color correction information 616 determined by the image signal processor 610 to encode the output 640.

In some implementations, the image signal processor 610 may include a motion estimation unit (not shown), which may generate motion estimation information for use in image signal processing and encoding, such as in correcting distortion, stitching, and/or motion compensation. In some implementations, the motion estimation unit may partition the input image signal 630 into blocks, such as having 4×4, 16×16, 64×64, and/or other dimensions. In some implementations, the motion estimation unit may partition the input image signal 630 into arbitrarily shaped patches and/or individual pixels.

The motion estimation unit may compare pixel values of blocks of pixels between image frames, such as successive image frames, from the input image signal 630 to determine displacement, or movement, between frames. The motion estimation unit may produce motion vectors, such as an 'x' component and a 'y' component of motion, at multiple locations within an image frame. The motion vectors may be represented by a translational model or other models that may approximate camera motion, such as rotation and translation in three dimensions, and zooming.

Figure 7:
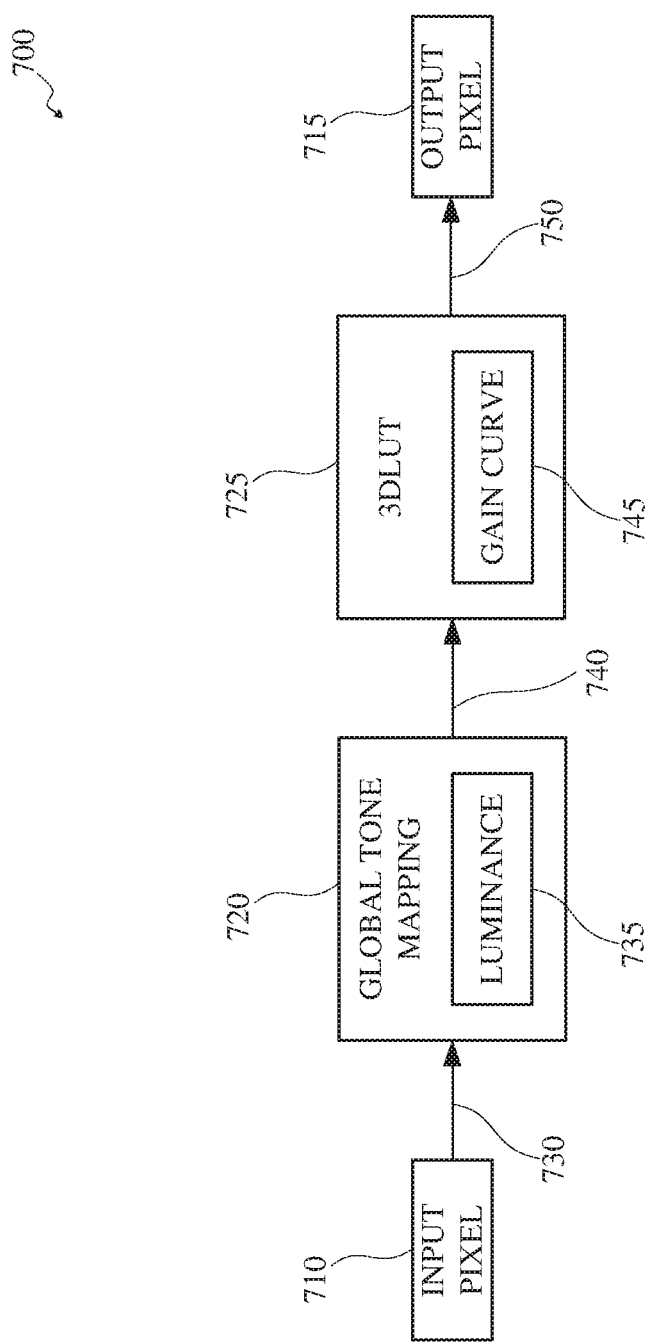
FIG. 7 is a functional block diagram of an example of an image processor.

FIG. 7 is a functional block diagram of an example of a color correction unit 700 of an image signal processor. For example, the color correction unit 700 may be the color correction unit 612 of the image signal processor 610 shown in FIG. 6. The color correction unit 700 receives an input pixel 710 (e.g., of an input image to be encoded) and processes it to produce an output pixel 715. The color correction unit 700 includes a global tone mapping unit 720 and a three dimensional lookup table unit 725.

The global tone mapping unit 720 receives the input pixel 710 in a linear signal 730. The global tone mapping unit 720 uses a luminance unit 735 to define a color correction matrix for the input pixel 710 and determine new luminance coefficients of the input pixel 710 based on the color correction matrix. The color correction unit 700 outputs a new luminance value 740. The new luminance value 740 reflects a new luminance value for the input pixel 710 based on the new luminance coefficients determined for the input pixel 710.

The three dimensional lookup table unit 725 receives the new luminance value 740 and uses a gain curve unit 745 to modify contrast values of the image to be encoded based on the new luminance value 740. The three dimensional lookup table unit 725 converts the data associated with the input pixel 710 from the linear signal to a non-linear signal 750. The three dimensional lookup table unit 725 may query a lookup table based on the new luminance value 740 to modify the contrast values of the image to be encoded. The non-linear signal 750 output from the three dimensional lookup table unit 725 includes the output pixel 715. The output pixel 715 can then be used to modify an image to be encoded.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared, or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smartphones, personal integrated communication or entertainment devices, or another device capable of executing a set of instructions.

As used herein, the term "computer program" or "software" is meant to include any sequence of machine-cognizable steps which perform a function. Such program may be rendered in any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include FPGAs, PLDs, RCFs, SoCs, ASICs, and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), DRAM, Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of DSPs, reduced instruction set computers (RISCs), general-purpose complex instruction set computing (CISC) processors, microprocessors, gate arrays (e.g., field programmable gate arrays (FPGAs)), PLDs, RCFs, array processors, secure microprocessors, ASICs, and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, Cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. An image capture apparatus, comprising:
    an image capture device configured to capture an image, the image including multiple pixels, a given pixel being characterized by color components and a luminance value associated with the color components;
    a memory; and
    a processor configured to execute instructions stored in the memory to:
        receive the image from the image capture device;
        for the given pixel of the pixels:
            identify a color correction matrix including color correction values for modifying luminance coefficients of the given pixel, the luminance coefficients used to determine the luminance value associated with the color components of the given pixel;
            determine new luminance coefficients for the given pixel by modifying the luminance coefficients of the given pixel according to individual ones of the color correction values; and
            determine a new luminance value for the given pixel by modifying magnitudes of the color components of the given pixel according to the new luminance coefficients;
        determine a gain curve for modifying contrast values of the image based on new luminance values determined for at least some of the pixels; and
        modify the image by modifying the contrast values according to the gain curve.

2. The image capture apparatus of claim 1, wherein the luminance coefficients of the given pixel include a first luminance coefficient associated with a first color component of the given pixel, a second luminance coefficient associated with a second color component of the given pixel, and a third luminance coefficient associated with a third color component of the given pixel, and
    wherein determining the new luminance coefficients for the given pixel by modifying the luminance coefficients of the given pixel according to the individual ones of the color correction values comprises:
        determining a first new luminance coefficient by modifying the luminance coefficients according to values in a first column of the color correction matrix;
        determining a second new luminance coefficient by modifying the luminance coefficients according to values in a second column of the color correction matrix; and
        determining a third new luminance coefficient by modifying the luminance coefficients according to values in a third column of the color correction matrix.

3. The image capture apparatus of claim 2, wherein determining the new luminance value for the given pixel by modifying the magnitudes of the color components of the given pixel according to the new luminance coefficients comprises:
  determining a first value by modifying a magnitude of the first color component according to the first luminance coefficient;
  determining a second value by modifying a magnitude of the second color component according to the second luminance coefficient;
  determining a third value by modifying a magnitude of the third color component according to the third luminance coefficient; and
  determining the new luminance value by combining the first value, the second value, and the third value.

4. The image capture apparatus of claim 1, wherein the color correction matrix used for the given pixel is a 3×3 matrix.

5. The image capture apparatus of claim 1, wherein modifying the image by modifying the contrast values according to the gain curve comprises:
  modifying the contrast values according to a gamma curve using data stored in a three-dimensional lookup table.

6. The image capture apparatus of claim 1, wherein the new luminance values are determined while the image remains in a linear signal.

7. A method for modifying an image captured using an image capture device, the method comprising:
  receiving the image from the image capture device, the image including multiple pixels, a given pixel being characterized by color components and a luminance value associated with the color components;
  determining new luminance values for the pixels by performing global tone mapping against the pixels using color correction values applied against respective luminance values and color components of the pixels;
  determining a gain curve for modifying contrast values of the image based on at least one of the new luminance values; and
  modifying the image by modifying the contrast values according to the gain curve.

8. The method of claim 7, wherein determining the new luminance values for the pixels by performing the global tone mapping against the pixels using the color correction values applied against the respective luminance values and color components of the pixels comprises:
  identifying a color correction matrix for modifying luminance coefficients of the given pixel, the color correction matrix including the color correction values, the luminance coefficients of the given pixel used to determine the luminance value associated with the color components of the given pixel;
  determining new luminance coefficients for the given pixel by modifying the luminance coefficients according to individual ones of the color correction values; and
  determining the new luminance value for the given pixel by modifying magnitudes of the color components of the given pixel according to the new luminance coefficients.

9. The method of claim 8, wherein the luminance coefficients of the given pixel include a first luminance coefficient associated with a first color component of the given pixel, a second luminance coefficient associated with a second color component of the given pixel, and a third luminance coefficient associated with a third color component of the given pixel, and
  wherein determining the new luminance coefficients for the given pixel by modifying the luminance coefficients according to the individual ones of the color correction values comprises:
    determining a first new luminance coefficient by modifying the luminance coefficients according to values in a first column of the color correction matrix;
    determining a second new luminance coefficient by modifying the luminance coefficients according to values in a second column of the color correction matrix; and
    determining a third new luminance coefficient by modifying the luminance coefficients according to values in a third column of the color correction matrix.

10. The method of claim 9, wherein determining the new luminance value for the given pixel by modifying the magnitudes of the color components of the given pixel according to the new luminance coefficients comprises:
  determining a first value by modifying a magnitude of the first color component according to the first luminance coefficient;
  determining a second value by modifying a magnitude of the second color component according to the second luminance coefficient;
  determining a third value by modifying a magnitude of the third color component according to the third luminance coefficient; and
  determining the new luminance value by combining the first value, the second value, and the third value.

11. The method of claim 8, wherein the color correction matrix is a 3×3 matrix.

12. The method of claim 7, wherein modifying the image by modifying the contrast values according to the gain curve comprises:
  modifying the contrast values according to a gamma curve using data stored in a three-dimensional lookup table.

13. The method of claim 7, wherein the new luminance values are determined while the image remains in a linear signal.

14. An image processor, comprising:
  an image modification processing unit configured to:
    receive an image, the image including multiple pixels, a given pixel being characterized by color components and luminance coefficients;
    identify a color correction matrix including color correction values for modifying the luminance coefficients of the given pixel;
    determine new luminance coefficients for the given pixel by modifying the luminance coefficients of the given pixel according to individual ones of the color correction values; and
    modify the image using a new luminance value for the given pixel, the new luminance value determined by modifying magnitudes of the color components of the given pixel according to the new luminance coefficients.

15. The image processor of claim 14, wherein the luminance coefficients include a first luminance coefficient associated with a first color component of the given pixel, a second luminance coefficient associated with a second color component of the given pixel, and a third luminance coefficient associated with a third color component of the given pixel, and wherein the image modification processing unit is configured to determine the new luminance coefficients by modifying the luminance coefficients of the given pixel according to the individual ones of the color correction values by:

determining a first new luminance coefficient by modifying the luminance coefficients according to values in a first column of the color correction matrix;

determining a second new luminance coefficient by modifying the luminance coefficients according to values in a second column of the color correction matrix; and determining a third new luminance coefficient by modifying the luminance coefficients according to values in a third column of the color correction matrix.

16. The image processor of claim 15, wherein the image modification processing unit is configured to determine the new luminance value by:

determining a first value by modifying a magnitude of the first color component according to the first luminance coefficient;

determining a second value by modifying a magnitude of the second color component according to the second luminance coefficient;

determining a third value by modifying a magnitude of the third color component according to the third luminance coefficient; and determining the new luminance value by combining the first value, the second value, and the third value.

17. The image processor of claim 14, wherein the image modification processing unit is configured to modify the image using the new luminance value for the given pixel by:

determining a gain curve for modifying contrast values of the image based on the new luminance value; and modifying the contrast values according to a gamma curve using data stored in a three-dimensional lookup table.

18. The image processor of claim 14, wherein the image modification processing unit uses the luminance coefficients to determine a luminance value associated with the color components of the given pixel.

19. The image processor of claim 14, wherein the image modification processing unit determines new luminance values for at least some of the pixels of the image.

20. The image processor of claim 19, wherein the image modification processing unit determines the new luminance values while the image remains in a linear signal.

* * * * *